United States Patent
Schaefer et al.

(10) Patent No.: US 11,841,001 B2
(45) Date of Patent: Dec. 12, 2023

(54) METHOD AND SYSTEM FOR DIRECT DETERMINATION OF THEORETICAL DAMAGE TO AT LEAST ONE COMPONENT OF A DEVICE

(71) Applicant: ZF Friedrichshafen AG, Friedrichshafen (DE)

(72) Inventors: Johannes Schaefer, Friedrichshafen (DE); Marco Sticker, Braeunlingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 376 days.

(21) Appl. No.: 17/269,266

(22) PCT Filed: Jul. 15, 2019

(86) PCT No.: PCT/EP2019/068933
§ 371 (c)(1),
(2) Date: Feb. 18, 2021

(87) PCT Pub. No.: WO2020/038654
PCT Pub. Date: Feb. 27, 2020

(65) Prior Publication Data
US 2021/0180569 A1  Jun. 17, 2021

(30) Foreign Application Priority Data
Aug. 21, 2018 (DE) ...................... 10 2018 214 099.5

(51) Int. Cl.
*F03D 17/00* (2016.01)
*G01M 13/025* (2019.01)
(Continued)

(52) U.S. Cl.
CPC .......... *F03D 17/00* (2016.05); *G01M 13/025* (2013.01); *G05B 23/0283* (2013.01);
(Continued)

(58) Field of Classification Search
CPC combination set(s) only.
See application file for complete search history.

(56) References Cited

U.S. PATENT DOCUMENTS

| 11,138,816 B1 * | 10/2021 | Bechhoefer ............ G07C 5/085 |
| 2005/0049835 A1 | 3/2005 | Mayer et al. |

(Continued)

FOREIGN PATENT DOCUMENTS

| CN | 103063425 A | 4/2013 |
| CN | 106441851 A | 2/2017 |

(Continued)

OTHER PUBLICATIONS

Lu Yaohui et.al, "Load Spectrum Compilation and Analysis of Acceleration Life Test for High Speed Train Carbody," Journal of Mechanical Engineering, Dec. 2017, pp. 165-174, vol. 53 No. 24, China Academic Journal Electronic Publishing House, China.

(Continued)

*Primary Examiner* — Binh Q Tran
(74) *Attorney, Agent, or Firm* — LEYDIG, VOIT & MAYER, LTD.

(57) ABSTRACT

A method for directly determining a theoretical damage of at least one component of a device includes providing load-specific reference data in an evaluation unit, sensing actual load-specific data by a load sensing system, and transmitting the actual, load-specific data to the evaluation unit. The actual load-specific data includes classified load collectives comprising a dwell time of occurring damage variables at defined load levels, a number of load changes of occurring damage variables, and an event count of occurring damage variables. The method further includes scaling the load-specific reference data to the actual load-specific data for calculating the theoretical damage of the at least one component and determining a remaining service life.

12 Claims, 2 Drawing Sheets

(51) Int. Cl.
- *G05B 23/02* (2006.01)
- *G01M 5/00* (2006.01)
- *G01M 1/12* (2006.01)
- *G01M 13/027* (2019.01)
- *G01M 13/021* (2019.01)
- *F03D 80/50* (2016.01)
- *F03D 7/02* (2006.01)
- *F03D 7/04* (2006.01)

(52) U.S. Cl.
CPC ............ *F03D 7/0288* (2013.01); *F03D 7/041* (2013.01); *F03D 80/50* (2016.05); *G01M 1/125* (2013.01); *G01M 5/0016* (2013.01); *G01M 5/0041* (2013.01); *G01M 13/021* (2013.01); *G01M 13/027* (2013.01); *G05B 2219/37209* (2013.01); *G05B 2219/37252* (2013.01)

(56) References Cited

U.S. PATENT DOCUMENTS

| | | | |
|---|---|---|---|
| 2011/0234391 A1 | 9/2011 | Barth et al. | |
| 2013/0035798 A1* | 2/2013 | Zhou | F03D 80/50 700/287 |
| 2014/0379199 A1 | 12/2014 | Schulz et al. | |
| 2015/0101401 A1* | 4/2015 | Ekanayake | F03D 17/00 73/112.01 |
| 2017/0089325 A1* | 3/2017 | Timbus | G05B 23/0283 |
| 2018/0180024 A1* | 6/2018 | Spruce | G05B 15/02 |
| 2018/0187648 A1 | 7/2018 | Spruce et al. | |
| 2019/0278642 A1* | 9/2019 | Correia | G01M 13/04 |
| 2021/0203157 A1* | 7/2021 | Visweswariah | G06F 18/2413 |

FOREIGN PATENT DOCUMENTS

| | | |
|---|---|---|
| CN | 107820540 A | 3/2018 |
| DE | 19850881 A1 | 5/2000 |
| DE | 10144076 A1 | 3/2003 |
| DE | 10257793 A1 | 7/2004 |
| DE | 102008049754 A1 | 4/2010 |
| DE | 102012218899 A1 | 4/2014 |
| DE | 102015222324 A1 | 3/2018 |
| DE | 102017200274 A1 | 7/2018 |
| EP | 2264314 B1 | 5/2016 |

OTHER PUBLICATIONS

Institute of Power Machinery and Engineering, Department of Thermal Energy Engineering, Gas Turbine and Gas-Steam Combined-Cycle, Aug. 2007, pp. 273-274, vol. 1, China Electric Power Press, Tsinghua University, and Shenzhen Nanshan Power Co., Ltd., Beijing, China.

* cited by examiner

METHOD AND SYSTEM FOR DIRECT DETERMINATION OF THEORETICAL DAMAGE TO AT LEAST ONE COMPONENT OF A DEVICE

CROSS REFERENCE TO RELATED APPLICATIONS

This application is a U.S. National Phase Application under 35 U.S.C. § 371 of International Application No. PCT/EP2019/068933, filed on Jul. 15, 2019, and claims benefit to German Patent Application No. DE 10 2018 214 099.5, filed on Aug. 21, 2018. The International Application was published in German on Feb. 27, 2020 as WO 2020/038654 under PCT Article 21(2).

FIELD

The present disclosure relates to a method for directly determining theoretical damage of at least one component of a device, a system for carrying out said method, and a computer program product.

BACKGROUND

DE 10 2012 218 899 A1 discloses a method for determining the remaining service life of drive-specific and/or control-specific components of a motor vehicle. Initially, drive-specific and/or control-specific data such as engine torque, gear information, speed, braking force or the like of at least one drive-specific and/or control-specific component are detected. The detected drive-specific and/or control-specific data are recorded, so that subsequently damage to at least one drive-specific and/or control-specific component is calculated on the basis of the recorded data. Finally, the remaining service life of the at least one drive-specific and/or control-specific component is determined on the basis of the calculated damage.

SUMMARY

In an embodiment, the present invention provides a method for directly determining a theoretical damage of at least one component of a device. The method includes providing load-specific reference data in an evaluation unit, sensing actual load-specific data by a load sensing system, and transmitting the actual, load-specific data to the evaluation unit. The actual load-specific data includes classified load collectives comprising a dwell time of occurring damage variables at defined load levels, a number of load changes of occurring damage variables, and an event count of occurring damage variables. The method further includes scaling the load-specific reference data to the actual load-specific data for calculating the theoretical damage of the at least one component and determining a remaining service life.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
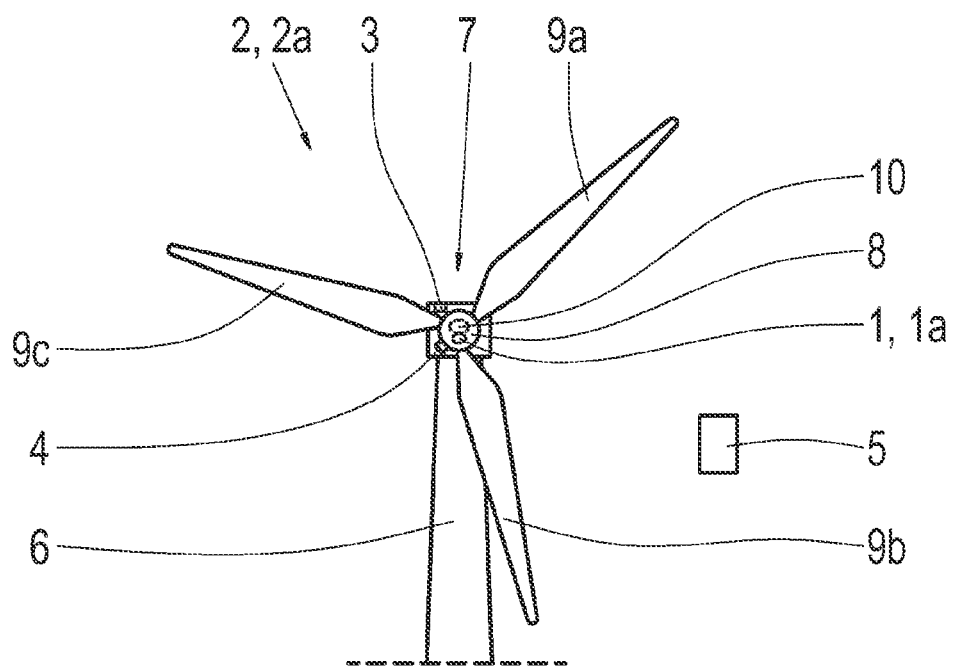
FIG. 1 provides a simplified schematic partial illustration of a wind turbine with a system for directly determining theoretical damage to a wind turbine component.

The present describes an improved method and system for residual life calculation, and in particular, for realizing a faster damage calculation during operation.

A method according to the disclosure for directly determining a theoretical damage of at least one component of a device includes providing load-specific reference data of at least one component in an evaluation unit, wherein load-specific actual data are sensed by a load sensing system and transmitted to the evaluation unit, wherein the load-specific reference data provided on the evaluation unit are scaled to the actual load-specific data in order to calculate the theoretical damage of at least one component and to determine the remaining service life. In other words, the method enables a direct calculation of the theoretical damage of at least one component. The theoretical damage is composed of a plurality of damage values of at least one component and is used to estimate real damage of at least one component. In other words, the real damage to at least one component is theoretically quantified. Consequently, a rapid, quasi-real-time-capable calculation method is proposed in order to directly determine the theoretical damage or the remaining life of one or more components of the device. The comparatively low computing effort required during operation of the device is particularly advantageous compared to methods known from the prior art. In other words, a higher but unique computing effort is required only in the planning and development of the device.

At least one component of the device means in particular a drive-specific and/or control-specific component of the device, which is preferably subjected to constant or cyclic loads during operation of the device, as well as being subjected to maintenance and/or servicing measures at determined intervals. Thus, the device may comprise a plurality of such components. The device may be, for example, a gearbox or a motor, wherein the component is a component of the gearbox or motor. For example, the component is an input or output shaft, a bearing element, a gear or a similar component. Furthermore, at least one component for which the theoretical damage and remaining life can be determined may also be an operating fluid, such as an oil, that tends to age or wear during operation of the device. In other words, the device preferably has a plurality of components which are relevant for operating the device and have a negative influence on the operation due to any damage that occurs and therefore need to be monitored.

The load-specific reference data are already determined in advance by means of any calculation method, wherein all relevant and/or possible load stages, which can occur during operation of the device, are defined and taken into account. In other words, the load-specific reference data is calculated before the device is in the field, i.e. in actual operation. The load-specific reference data can be calculated, for example, at an early development stage of the device in order to influence the design of the components at an early stage. In particular, this enables a reduction in costs, since complex and computationally intensive calculations of damage and remaining service life can be performed only once for all expected load points, thus eliminating the need for cost-intensive licenses, for example for CAE software. Thus, the load-specific reference data are determined in advance and stored on the evaluation unit of the device. This can be extended to any number of identical or similar devices without increasing the aforementioned cost. Furthermore, the predefined operating points, failure mechanisms and/or calculation methods are not stored in the device in a direct, universal and verifiable way, but only one database is used for carrying out the method. The method thus offers the possibility of making devices in a fleet assessable with regard to their damage. This results in possibilities of also operating the fleet in an optimized manner, for example with regard to a uniform utilization of all devices in order to load and utilize the devices in the same way. As a result, each device achieves the intended service life with higher probability and at a controllable time.

Any number of operating points or reference loads are defined in the pre-calculation in order to determine the reference data. These operating points are theoretically occurring load points comprising, for example, loads, rotational speeds, torques, temperatures, rotational directions of components, friction values and other damage-relevant operating points to be expected during operation. In other words, a determined load horizon is defined in advance for the device, which the device or at least one component is expected to pass through during operation. Damage-relevant operating points and load paths for calculating the theoretical damage are thus defined in advance for each component. The theoretical damage of each component can therefore be determined in advance for any given operating point. This reference data is provided and stored on the evaluation unit so that it can be scaled to the load-specific data of the device in order to calculate the theoretical damage during operation. The evaluation unit is preferably arranged in the device. It is also conceivable for the evaluation unit to be an external device which can receive and store the load-specific data of the device by means of cables or without cables.

The load-specific reference data preferably comprise at least one failure mechanism of at least one component. The term failure mechanism refers to a theoretical loading course that leads to damage and eventual failure or breakdown of at least one component. Each different component has one or more failure mechanisms that can theoretically occur during operation of the device and are defined in advance in order to determine the load-specific reference data. In other words, a theoretical damage value for each reference load is calculated for each failure mechanism of at least one component and stored in the evaluation unit. For example, a tooth of a gear wheel may have three failure mechanisms—first, failure due to tooth root breakage, and furthermore a tooth flank failure (pitting) of each tooth flank of a tooth. The theoretical damage can thus be calculated in advance for each individual failure mechanism of at least one component, taking into account the reference load levels relevant to the failure mechanism.

Preferably, the load-specific reference data comprises a plurality of damage values for discrete reference load levels. A theoretical damage value for each individual failure mechanism of at least one component is calculated in the preliminary calculation for each discrete reference load level, which can be scaled to the actual load-specific data. Furthermore, collective assumptions can be made in the preliminary design that are used to calculate the theoretical damage value.

The load-specific reference data is further preferably combined in at least one data structure. The data structure lists each predefined failure mechanism at each reference load level at each previously determined operating point. All the device components to be taken into account are preferably recorded in the data structure. Furthermore, it is conceivable that each component with its associated failure mechanisms, operating points and reference load levels is listed in its own separate data structure, wherein in this case the data structures are logically linked to one another.

The actual load-specific data is sensed by the load sensing system continuously or at determined intervals and transmitted to the evaluation unit, where it is stored. The load-specific reference data are then scaled to the actual load-specific data to determine the current theoretical damage of the respective component.

Preferably, the load-specific data comprise classified load collectives. The measured variables sensed by means of the load sensing system are converted in the evaluation unit and provided in classified load collectives, so that a calculation of the theoretical damage is possible with little computing effort. A load collective or stress collective is a data set that represents the stress on at least one component or several components of a system, by way of example a motor or a gearbox, which are, for example, operatively connected to one another, within a determined operating period of the device. By way of example, the course of a measured variable is plotted against time or the frequency with which this measured variable occurs. In this way, a data set of a speed/torque combination including the frequency of the respective combination that has occurred can be mapped in a load collective of a wind turbine.

The classified load collectives comprise, for example, a dwell time of occurring damage variables in defined reference load stages. Preferably, the classified load collectives comprise a number of load changes of occurring damage variables and/or an event count of occurring damage variables. During the event count, a determined occurring event is registered by the load sensing system during operation of the device and the frequency of occurrence is counted. This event is thus also an operating point which is defined in advance according to its type and duration and is stored on the evaluation unit. This may be a so-called special event, where a determined theoretically occurring operating point is outside the expected operating points. This is therefore an exception event which can exceptionally occur during operation but causes a real damage to the respective component. This real damage is theoretically quantified in the pre-calculation. In such a case, each occurrence of this event is counted, wherein when a maximum number is reached, it is assumed that the damage to the respective component has theoretically exceeded a predefined measurement and is thus, for example, to be replaced or spared. Furthermore, the evaluation unit can record the classified load collectives as rollover collectives or Rainflow classifications.

The variables relevant for the damage are actually sensed by the load sensing system and are measured variables that can be compared with the load-specific reference data. In other words, any possible influence and its effect with regard to the theoretical damage is already recorded or mapped in the load-specific reference data. The theoretical damage is real occurring damage, which is quantified theoretically. The load-specific reference data can thus be scaled to the actual load-specific data in order to determine the theoretical damage to at least one component. The theoretical damage can be calculated at any time during the operation of the device. The method thus makes it possible to directly, i.e. immediately, make statements about a current damage value and/or a remaining service life of the respective component, which allows better adaptation of economic operating strategies of the device. Component optimization can thus be carried out in the device planning for different operating strategies to be expected in the future, wherein future component damage and loads can be predicted in particular on the basis of the theoretical damage and remaining service life determined during operation.

The load collectives may have one or more dimensions. The dimensions depend, for example, on the influencing variables relevant for a failure mechanism of at least one component. For example, if the speed and torque are relevant to a failure mechanism of at least one component, the load collective is two-dimensional. However, three or more dimensions may also be provided. Thus, by way of example, a dwell time can be issued for the respective measurement period considered, during which at least one component, here for example a shaft, was present in a determined speed/torque combination during operation. Thus, these actually recorded speed/torque combinations are the actual load-specific data. For each of these speed/torque combinations, load-specific reference data with respective theoretical damage values are stored in the evaluation unit, which are scaled to the actual load-specific data in order to determine the theoretical damage of at least one component for the measurement period. This theoretical damage to at least one component can then be added up with other damage values from previous calculations to calculate total damage to at least one component. In other words, the recorded load collective is evaluated with the data structure to obtain an actual theoretical damage total of at least one component. In particular, the load collectives are first added up to determine the theoretical damage.

In accordance with a preferred exemplary embodiment, at least one failure criterion of at least one component is provided in the evaluation unit. A failure criterion is defined in advance for each failure mechanism of at least one component and stored in the evaluation unit. This failure criterion may also be provided in the data structure. This determines the criteria according to which the respective component is to be replaced as a function of the failure mechanism. Such a criterion can be, for example, a certain number of rollover of bearing elements or a certain dwell time of the component in a determined load stage or at a determined operating point. In general, however, the failure criterion is a damage value from which the component has theoretically reached its service life. Failure criteria can be predefined using Wohler curves, for example. However, it is also possible to estimate or determine the failure criteria on the basis of empirical values or mathematical empirical methods. The failure criterion is fulfilled when a determined theoretical damage value of the component occurs and, for example, replacement of the component is required. This is particularly advantageous for safety reasons, as repair measures can be initiated before the respective failure criterion is reached.

Furthermore, statements about the remaining service life of the component can be made from the ratio of the current total damage of at least one component and the defined failure criterion for the respective failure mechanism. This is done in particular by extrapolating the current theoretical damage. In other words, this ratio can be used to calculate the remaining load capacity of the respective component. Thus, a theoretical damage and a remaining lifetime of the at least one component can be determined virtually in real time or at any point in time. It is advantageous in particular that the theoretical damage to a plurality of components can be monitored simultaneously and assessed integrally.

At least one damage threshold value is preferably provided in the evaluation unit, so that when the damage threshold value is reached, an action request is sent from the evaluation unit to at least one receiver unit. The damage threshold is especially used to indicate when at least one component has reached a critical damage range. By way of a preferred example, this can amount to 80% of the total service life of the respective component. In other words, the damage threshold value is a damage value which has lower theoretical damage than the failure criterion. When the damage threshold is reached, this is displayed on the receiver unit, which is designed, for example, as a computer system or mobile terminal. The action request is to be understood in particular as a request for initiating a maintenance or repair measure. The receiver device is connected to the evaluation unit, for example, by means of a plug connection. Alternatively, it is conceivable for the evaluation unit to comprise a transmitting unit in order to be connected to the receiver unit without cables, for example by means of a radio connection. The receiver unit is preferably arranged within the device or system. It is also conceivable for the receiver unit to be an external device. Further alternatively, the receiver unit may be a cloud storage or a gateway. The data can thus also be stored on a virtual receiver unit.

The operation of the device is further preferably performed as a function of the theoretical damage to at least one component. During operation of the device, components of the device may experience varying degrees of wear, damage, or deterioration. In other words, these components have different theoretical total amounts of damage. Since the theoretical damage to each relevant component can be determined by the method in quasi-real time, the operating strategy of the device is adjusted depending on the damage. Consequently, a decision is thus made about the operating strategy on the basis of damage to at least one component and can therefore be set optimally for operation.

Preferably, determined operating points are avoided as a function of the theoretical damage to at least one component. In other words, the respective component is not exposed to these operating points, or only partially, or only for a brief period. For example, the operating points can be determined speed or torque combinations or, in the case of a gearbox, the respective gears of the gearbox. This will be illustrated using the example of a multi-gear transmission, wherein the respective components of the gearbox, by way of example gears or shafts, are subjected to different loads in each load path or gear and thus show different amounts of damage. If one of the gears has one or more components with a larger amount of damage than other gears, by way of example this same gear may only be used for a shorter time. Consequently, the other unaffected gears are used for a longer period of time by implication. Alternatively, depending on the application, this gear is not used at all in order to avoid or reduce further damage to at least partially damaged components. Damage to all relevant components can thus be made to be the same in order to increase the service life of the components and also of the device. In other words, damaged components are protected by avoiding determined operating points as a function of the theoretical damage. Furthermore, the device can be used for longer without interference. Additionally or alternatively, load ranges or load paths of damage values can also be avoided as a function of the theoretical damage.

In particular, the method can be carried out by a computer or by the evaluation unit. Thus, the method may be implemented in software. Thus, the associated software is a product that can be sold independently. Therefore, the disclosure also relates to a computer program product having machine-readable instructions which, when executed on a computer or on an evaluation unit, upgrades the computer and/or the evaluation unit to a calculation logic of the system or causes it to execute a method in accordance with the disclosure.

A system in accordance with the disclosure for directly determining theoretical damage to at least one component of a device comprises an evaluation unit provided to supply load-specific reference data, wherein the system further comprises a load sensing system for sensing actual load-specific data provided to be transmitted to the evaluation unit, wherein the evaluation unit is further provided to scale the load-specific reference data to the actual load-specific data to determine therefrom the theoretical damage and a remaining service life of at least one component.

The load sensing system is preferably part of the device control system and further preferably comprises a plurality of sensor elements which are provided to sense damage-relevant measurement variables and to transmit them to the evaluation unit. By way of example, acceleration sensors, optical sensors, strain gages or other suitable sensor elements can be integrated into the load sensing system. These measurement variables are received by the evaluation unit and converted to the actual load-specific data and stored, so that the theoretical damage to the respective component can be determined in the subsequent operation. Alternatively or additionally, the load sensing system can also provide estimated or previously calculated measurement variables for the evaluation unit, which are used to calculate the theoretical damage of the respective component.

The system according to the disclosure is particularly suitable for use in a wind turbine. Alternatively, the system can be used, for example, in a work machine, a construction machine, a passenger car, a commercial or a truck, wherein the system is advantageously used in devices and machines which, on account of their design, construction size and their field of use, have components and/or wear parts which are accessible only with difficulty and are subject to recurrent servicing and maintenance cycles.

In accordance with FIG. 1, a wind turbine 2a has a tower 6 with a horizontally rotatable nacelle 7. The nacelle 7 comprises a rotor, not shown in detail here, with a rotatable rotor shaft 10 which is indicated here by a dashed line and which is operatively connected at least to a rotor hub 8 and further to a component 1 to be monitored, in this case a gear wheel 1a. The gearwheel 1a is located in a gearbox of the wind turbine 2a, not shown in detail here, and is in mesh with another gearwheel, not shown here, to transmit a torque and a rotational speed. At least three partially rotatable rotor blades 9a, 9b, 9c are arranged on the rotor hub 8. The wind turbine 2a further comprises a system for directly determining theoretical damage to a component 1, in this case the gear wheel 1a, of the wind turbine 2a. Alternatively, the system according to can also be used in other devices to determine the theoretical damage of at least one component.

The system comprises an evaluation unit 3, which is intended to provide load-specific reference data, and a load sensing system 4 for sensing actual load-specific data. The actual load-specific data are intended to be transmitted to the evaluation unit 3, wherein the evaluation unit 3 is intended to scale the load-specific reference data to the actual load-specific data in order to determine therefrom the theoretical damage and remaining service life of the gearwheel 1a.

In accordance with a method for directly determining the theoretical damage to component 1 of the device 2, namely the gear wheel 1a, load-specific reference data are initially provided in the evaluation unit 3. These load-specific reference data comprise at least one component 1 failure mechanism and a plurality of damage values for discrete reference load levels, wherein the discrete reference load levels comprise all loads and operating conditions theoretically occurring during the operation of the wind turbine 2a. A failure mechanism of the gear wheel 1a is, for example, a tooth root breakage or so-called pitting at the tooth flanks. Since each tooth of gear wheel 1a has two tooth flanks and a tooth root, the gear wheel has three damage-relevant failure mechanisms. Furthermore, the load-specific reference data are combined in a data structure. For example, the load-specific reference data are combined in a damage matrix. Consequently, the load-specific reference data of the gear wheel 1a, for example the number of load cycles or a dwell time at a determined torque, are included in the damage matrix.

In a further method step, actual load-specific data are sensed by the load sensing system 4 and transmitted to the evaluation unit 3. The actual load-specific data comprise classified load collectives. The classified load collectives comprise a dwell time of occurring damage variables in defined reference load levels as well as a number of load cycles of occurring damage variables. In order to calculate the theoretical damage to component 1, the load-specific reference data are scaled to the actual load-specific data in evaluation unit 3, wherein, for example, a theoretical remaining service life of the gear wheel 1a can be determined. Furthermore, at least one failure criterion of the gear 1a is provided in the evaluation unit 3, wherein when the failure criterion is reached, it defines theoretical full damage of the gear wheel 1a. In other words, when the failure criterion is reached, the gear wheel 1a is theoretically damaged to such an extent that further operation of the gear wheel 1a in the wind turbine 2a is theoretically no longer possible and thus the gear wheel 1a has theoretically failed. A damage threshold value is therefore provided in the evaluation unit 3, so that when the damage threshold value is reached, an action request is sent from the evaluation unit 3 to at least one receiver unit 5.

The receiver unit 5 is presently outside the wind turbine 2a, preferably with an operator of the wind turbine 2a. For example, the damage threshold value is set to 80% in the case of theoretical damage to component 1. Thus, the operator of the wind turbine 2a can schedule maintenance and replacement of the gear wheel 1a in good time. The operating strategy of wind turbine 2a can thus be optimized with regard to maintenance timing, service life, replacement procurement and economic considerations. For example, the operator of the wind turbine 2a may adjust the operation of the wind turbine 2a as a function of the theoretical damage to the gear wheel 1a so that determined operating points are avoided as a function of the theoretical damage to the gear wheel 1a. For example, the gear wheel 1a may be operated in such a way that the dwell time at a determined torque is reduced or avoided in order to reduce or avoid more severe damage to the gear wheel 1a. The method provides the operator of the wind turbine 2a with a quantified statement regarding respective current theoretical damage of the gear wheel 1a with reduced computing power at the same time. Furthermore, for example, the supplied electrical energy and the resulting damage to the gear wheel 1a or additionally also to other components of the wind turbine 2a can be related.

Figure 2:
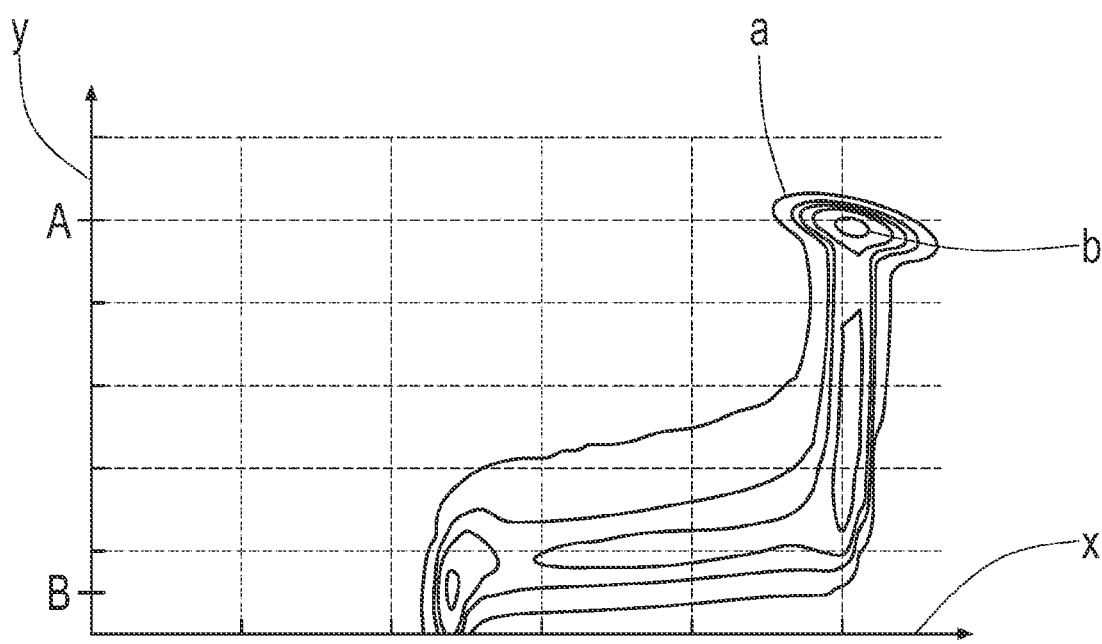
FIG. 2 provides a diagram for illustrating a data set of normalized rotational speeds and torques of the wind turbine component.

FIG. 2 is a diagram illustrating a data set of normalized rotational speeds and torques of the gear wheel 1a of the wind turbine 2a. The normalized rotational speed is plotted on the abscissa X and the normalized torque is plotted on the ordinate Y. The diagram illustrates the operation of the gear wheel 1a as a function of the rotational speed and the torque, wherein the dwell time of an operating state increases from a given waveform a to an inner waveform b. The outer curve a illustrates the operation of gear wheel 1a at a determined speed and torque with a short dwell time, and the inner curve b illustrates the operation of gear wheel 1a at a determined speed and torque with a greater dwell time. In the present case, the gear wheel 1a was not operated. This diagram thus represents operation along a distinct characteristic curve or load collective of the wind turbine 2a that actually occurred.

Figure 3:
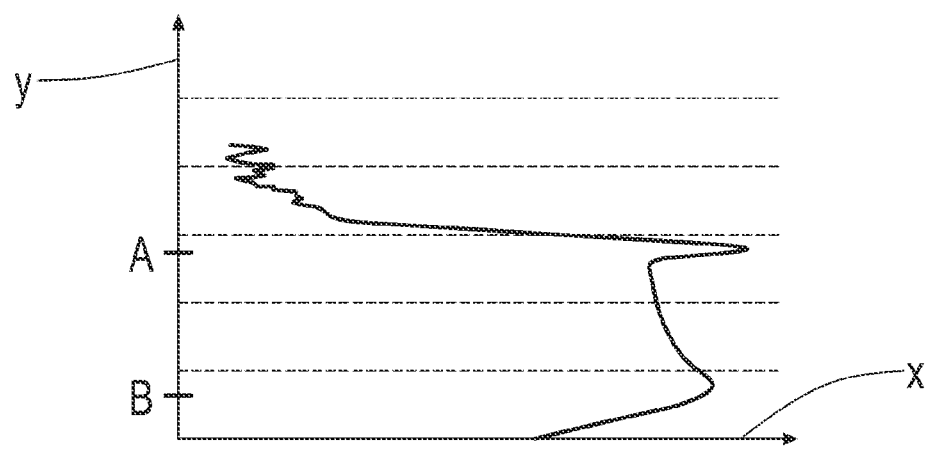
FIG. 3 provides a diagram for illustrating a number of load changes of the wind turbine component as a function of the torque in accordance with FIG. 2.

FIG. 3 shows a diagram illustrating a number of load cycles of the wind turbine component as a function of the torque in accordance with FIG. 2. In this case, the number of load changes, or the number of rollover, is plotted logarithmically on the abscissa X and the torque is plotted on the ordinate Y. The diagram shows that the gear 1a was operated most frequently at a first torque A, or rather that the most rollovers occurred at the first torque A. A torque greater than the first torque A meant that gear wheel 1a was operated considerably less frequently, because considerably fewer rollovers occurred. Furthermore, starting from the first torque A with decreasing torque, the curve initially shows a local minimum with regard to the number of rollovers and then a local maximum with regard to the number of rollovers at a second torque B. Thus, the second most frequently operated gear wheel 1a was at the second torque B, which is less than the first torque A. The first and second torques A, B are also shown in FIG. 3, wherein the first torque A has the maximum dwell time, and wherein the second torque B has the second largest dwell time.

Figure 4:
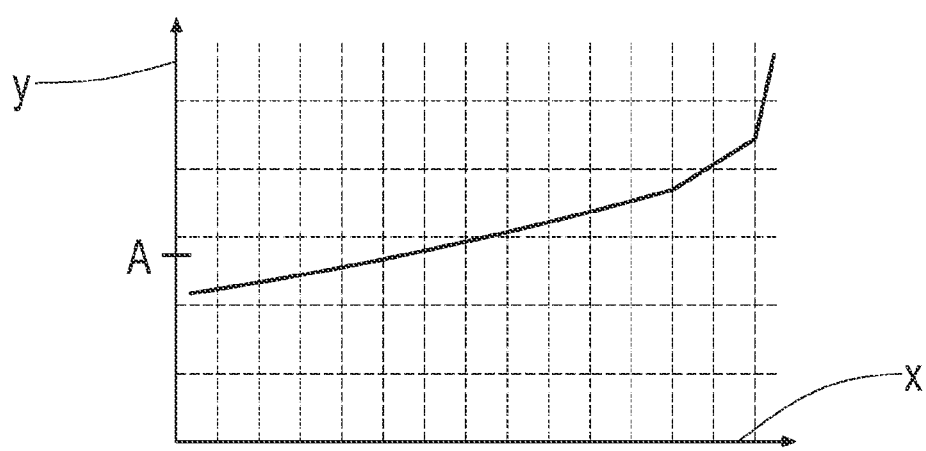
FIG. 4 provides a diagram illustrating the theoretical damage value for a failure mechanism of the wind turbine component.

FIG. 4 shows a diagram illustrating the load capacity for a failure mechanism of the gear wheel 1a of the wind turbine 2a. The damage to the gear wheel 1a is plotted logarithmically on the abscissa X, and the torque is plotted on the ordinate Y. The ordinate Y of FIG. 4 corresponds to the ordinate of FIG. 3, wherein the first torque A of FIG. 3 is equivalent to the first torque A of FIG. 4. The diagram shows that as the torque increases, the theoretical damage to gear wheel 1a increases considerably. Here, the diagram is only shown for a single failure mechanism, for example a tooth root breakage. Further failure mechanisms can also be calculated for further components 1 of the wind turbine 2a, depending on the requirements and availability of calculation models and depending on the type and load of the component 1.

Figure 5:
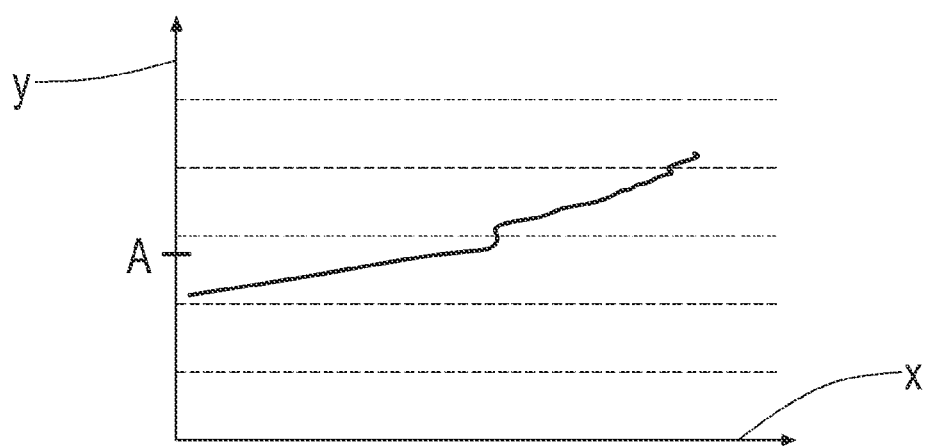
FIG. 5 provides a diagram illustrating the theoretical damage value for the wind turbine component.

When using the method according to the disclosure and scaling the load-specific reference data to the actual load-specific data for calculating the theoretical damage or damage total for the gear wheel 1a and the failure mechanism under consideration this results in a specific representation, which is depicted in FIG. 5. FIG. 5 shows a diagram for illustrating the theoretical damage amount for the gear wheel 1a. The theoretical damage to the gear wheel 1a is plotted logarithmically on the abscissa X, and the sensed torque is plotted on the ordinate Y. The ordinate Y of FIG. 5 corresponds to the ordinate of FIG. 3 and FIG. 4, wherein the first torque A of FIG. 3 and FIG. 4 is equivalent to the first torque A of FIG. 5. The abscissa X from FIG. 5 is not equivalent to the abscissa X from FIG. 4. In other words, a different range of values is plotted on the abscissa X of FIG. 5 than on the abscissa X of FIG. 4. The diagram shows that the greatest damage to gear wheel 1a occurs at high torques. The theoretical damage amount can be compared with the theoretical failure, the tested loads and the empirical values from other plants. The output of the wind turbine 2a results from the energy fed into the wind turbine 2a, namely power over time. In a simplified consideration without exact consideration of efficiencies and other factors, the output is thus proportional to the power transmitted by the rotor shaft 10.

The disclosure is not limited to the exemplary embodiment described above. For example, the system can be used to directly determine the theoretical damage of at least one component in other devices. For example, the use of the system according to the disclosure in a gearbox for a motor vehicle or industrial machinery is conceivable.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Component
1a Gear box
2 Device
2a Wind turbine
3 Evaluation unit
4 Load sensing system
5 Receiver unit
6 Tower
7 Nacelle
8 Rotor hub
9a Rotor blade
9b Rotor blade
9c Rotor blade
10 Rotor shaft
A first torque
B second torque
a outer course of curve
b inner course of curve X Abscissa
Y Ordinate

The invention claimed is:

1. A method for directly determining a theoretical damage of at least one component of a device, the method comprising:
providing load-specific reference data in an evaluation unit;
sensing actual load-specific data by a load sensing system;
transmitting the actual, load-specific data to the evaluation unit, wherein the actual load-specific data includes classified load collectives comprising a dwell time of occurring damage variables at defined load levels, a number of load changes of occurring damage variables, and an event count of occurring damage variables; and
scaling the load-specific reference data to the actual load-specific data for calculating the theoretical damage of the at least one component and determining a remaining service life.

2. The method according to claim 1, wherein the load-specific reference data includes a plurality of damage values for discrete reference load stages.

3. The method according to claim 1, wherein the load-specific reference data includes at least one failure mechanism of at least one component.

4. The method according to claim 1, wherein the load-specific reference data are combined in at least one data structure.

5. The method according to claim 1, wherein at least one failure criterion of at least one component is provided in the evaluation unit.

6. The method according to claim 1, wherein at least one damage threshold value is provided in the evaluation unit, so that when the damage threshold value is reached, an action request is sent from the evaluation unit to at least one receiver unit.

7. The method according to claim 1, wherein an operation of the device is performed as a function of the theoretical damage of at least one component.

8. The method according to claim 1, wherein determined operating points are avoided as a function of the theoretical damage to at least one component.

9. A system for directly determining a theoretical damage of at least one component of a device, the system comprising:
an evaluation unit configured to provide load-specific reference data; a load sensing system configured to sense actual load-specific data, wherein the actual load-specific data includes classified load collectives comprising a dwell time of occurring damage variables at defined load levels, a number of load changes of occurring damage variables, and an event count of occurring damage variables,
wherein the evaluation unit is configured to receive the load-specific actual data, and
wherein the evaluation unit is further configured to scale the load-specific reference data to the load-specific actual data in order to determine the theoretical damage and remaining service life of at least one component.

10. A wind turbine including the system according to claim 9.

11. A computer program product comprising machine-readable instructions which, when executed by a computer, causes the computer to carry out the method according to claim 1.

12. The method according to claim 1, wherein the dwell time of occurring damage variables at defined load levels is an amount of time that the at least one component of the device was present in a determined rotational speed/torque combination during operation.

* * * * *